No. 812,643. PATENTED FEB. 13, 1906.
A. T. DAWSON & G. T. BUCKHAM.
BREECH MECHANISM OF ORDNANCE.
APPLICATION FILED SEPT. 30, 1904.
5 SHEETS—SHEET 2.
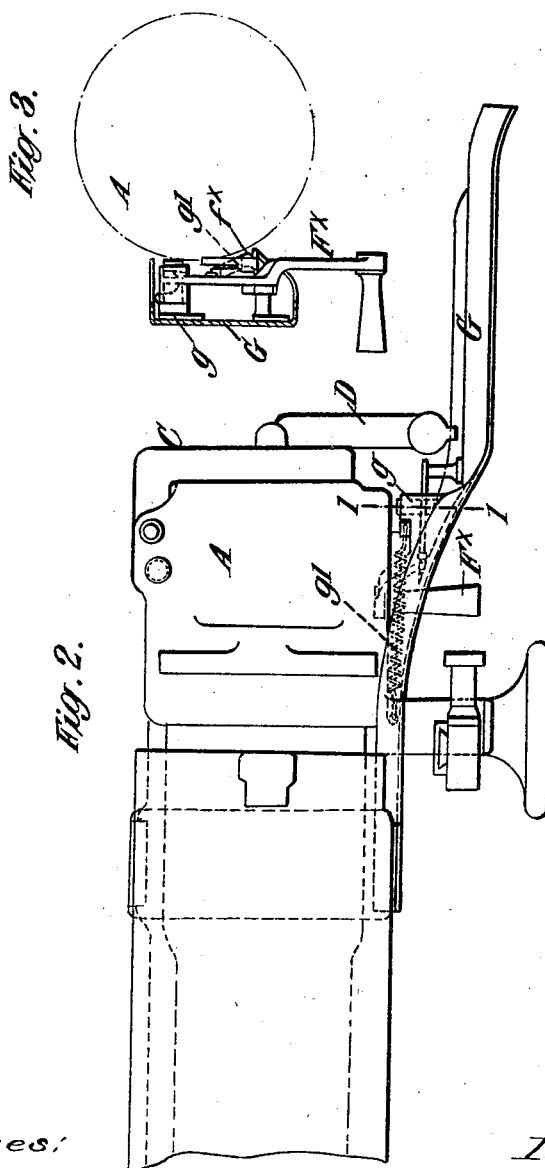
Witnesses:
Inventors
Arthur T. Dawson
George T. Buckham No. 812,643. PATENTED FEB. 13, 1906.
A. T. DAWSON & G. T. BUCKHAM.
BREECH MECHANISM OF ORDNANCE.
APPLICATION FILED SEPT. 30, 1904.

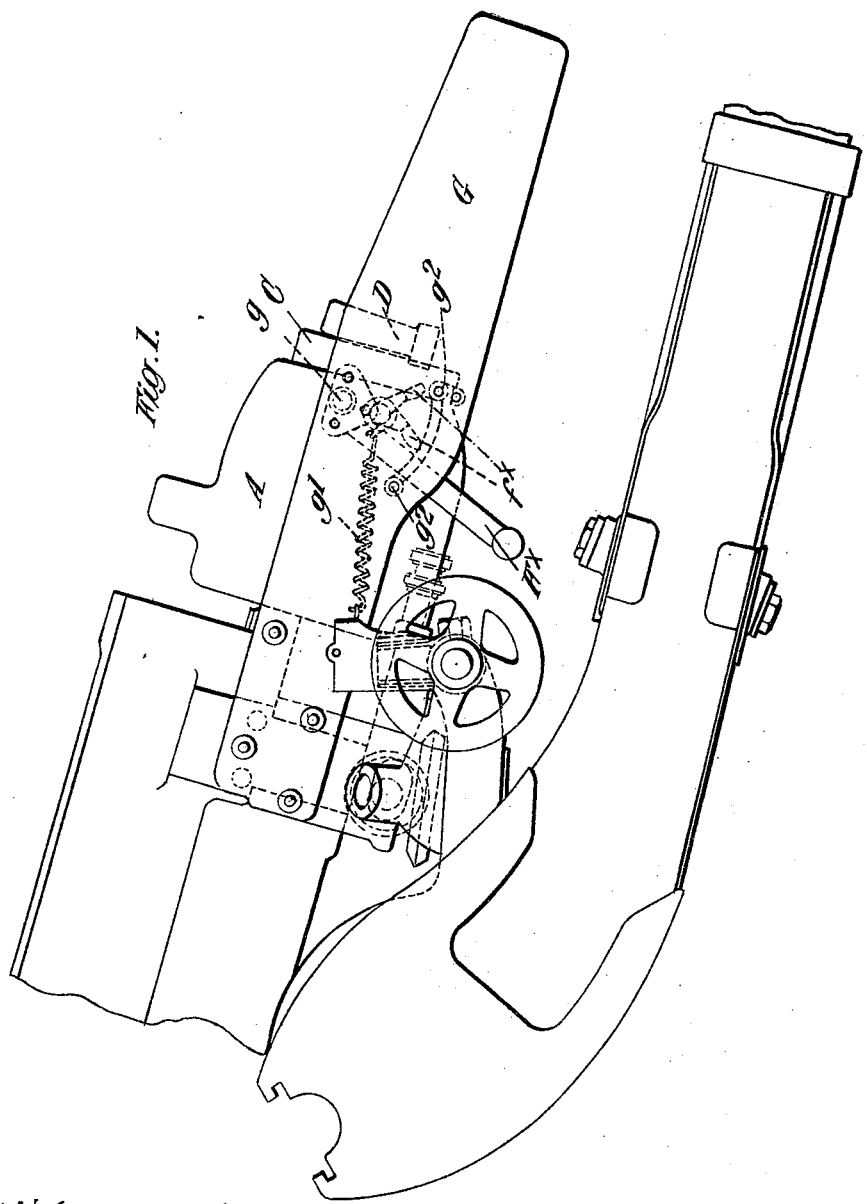

5 SHEETS—SHEET 3.

Witnesses:

Inventors
Arthur T. Dawson
George T. Buckham

No. 812,643. PATENTED FEB. 13, 1906.
A. T. DAWSON & G. T. BUCKHAM.
BREECH MECHANISM OF ORDNANCE.
APPLICATION FILED SEPT. 30, 1904.

5 SHEETS—SHEET 4.

Witnesses:

Inventors
Arthur T. Dawson
George T. Buckham

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM LIMITED, OF WESTMINSTER, ENGLAND.

BREECH MECHANISM OF ORDNANCE.

No. 812,643.     Specification of Letters Patent.     Patented Feb. 13, 1906.

Application filed September 30, 1904. Serial No. 226,691.

*To all whom it may concern:*

Be it known that we, ARTHUR TREVOR DAWSON, lieutenant of the Royal Navy, director and superintendent of ordnance works, and GEORGE THOMAS BUCKHAM, engineer, subjects of the King of Great Britain, residing at 32 Victoria street, Westminster, in the county of London, England, have invented certain new and useful Improvements Relating to the Breech Mechanism of Ordnance, of which the following is a specification.

This invention relates to the breech mechanism of quick-firing or other ordnance in which the charge is contained in a metallic cartridge-case.

In breech mechanism of the kind to which this invention is more especially applicable the breech is closed by a tapered screw-block whose larger diameter is directed inward or toward the charge-chamber of the gun, and the said block is angularly displaced for the purpose of locking or unlocking it with respect to the gun by means of a hand-lever that actuates a pinion gearing with teeth formed on the face of the breech-block. Within the block and coaxial therewith are arranged the firing-pin or striker and mainspring. The block is held in a swinging carrier by means of screw-threads, said carrier being hinged to the right-hand side of the gun. Hinged in close proximity to the carrier is a forked extractor having a toe which when the gun is swung open comes into contact with a suitable surface formed on the carrier and causes the cartridge-case to be quickly ejected from the gun.

The present invention relates generally to the above-described breech mechanism, and particularly to the firing-gear and to a safety device.

In order that our said invention may be clearly understood and readily carried into effect, we will describe the same with reference to the accompanying drawings, in which—

Figure 4:
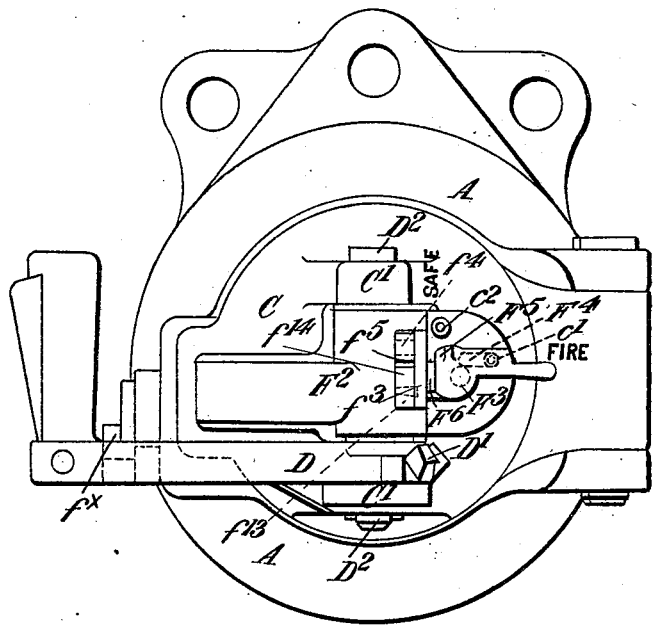
Figure 5:
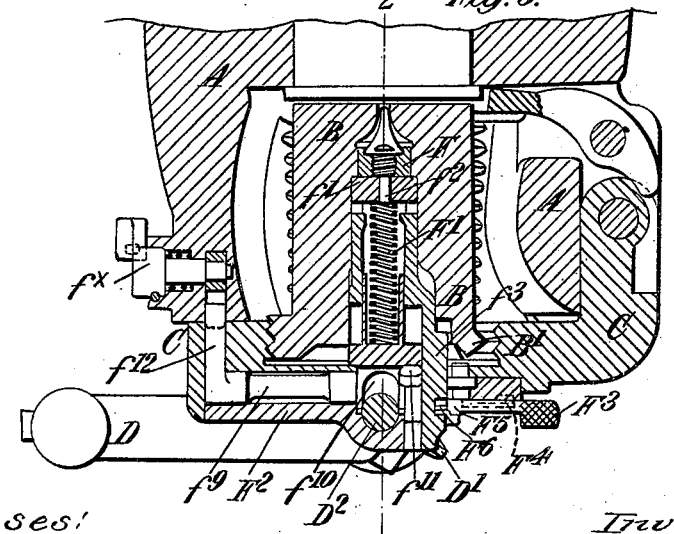
Figure 6:
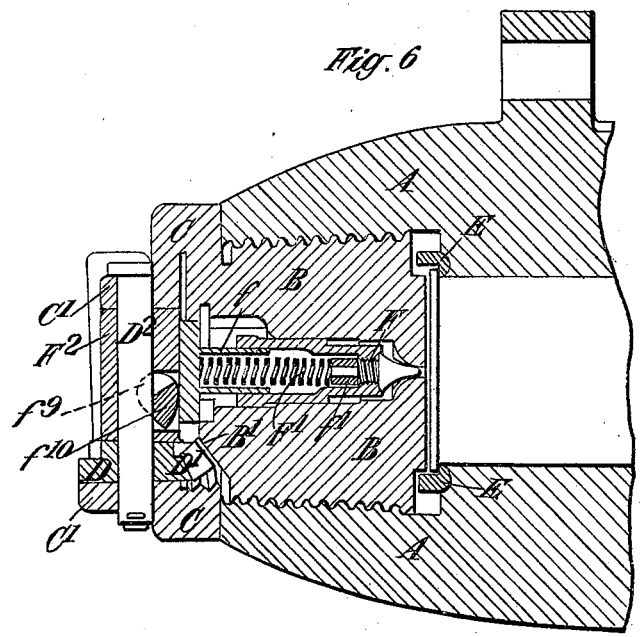
Figure 10:
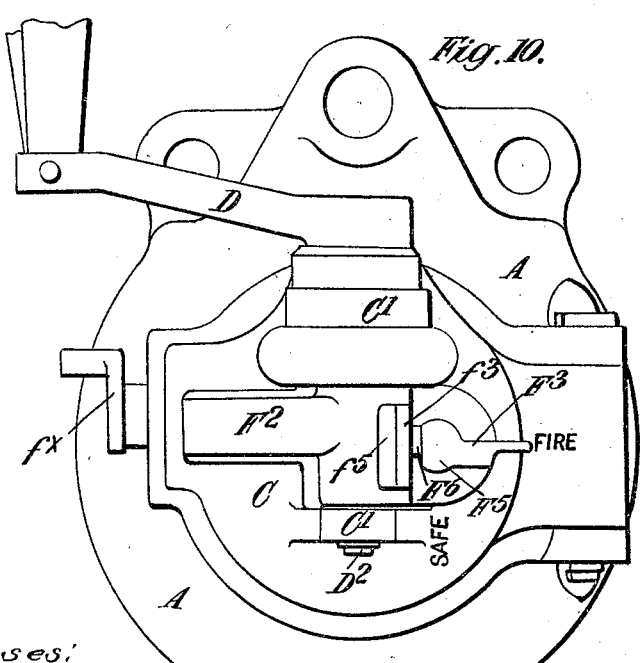
Figure 7:
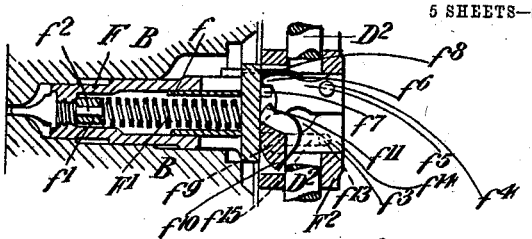
Figure 8:
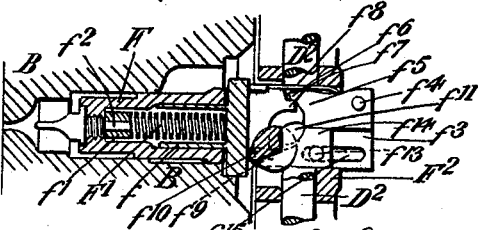
Figure 9:
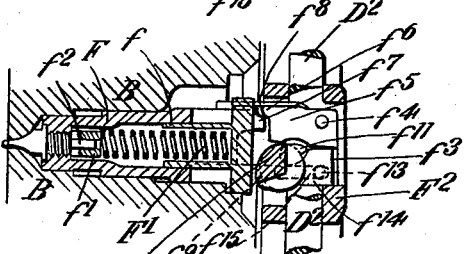
Figure 11:
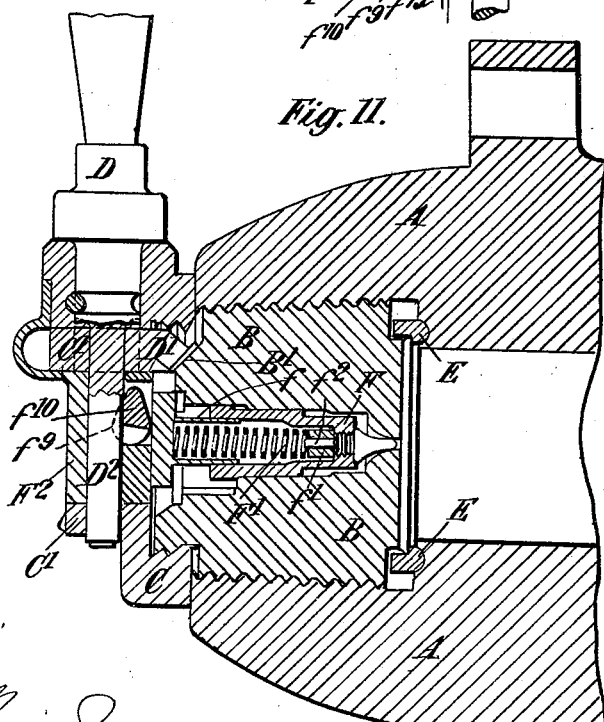

Figure 1 is a side elevation, and Fig. 2 a plan of the rear or breech end of a field-gun provided with our improved firing-gear. Fig. 3 is a transverse section taken approximately on the line 1 1 of Fig. 2. Fig. 4 is an end elevation, Fig. 5 a central horizontal section, and Fig. 6 a central vertical section, of the breech mechanism on a larger scale and showing more clearly the improved firing-gear. Figs. 7, 8, and 9 are vertical central sections on the line 2 2 of Fig. 5 looking toward the right, showing the firing-pin or striker and parts in immediate connection therewith in three different positions—that is to say, with the striker represented, respectively, in the normal, the cocked, and the fired position. Figs. 10 and 11 are an end elevation and a vertical central section of the breech mechanism, showing the hand-lever conveniently arranged for actuating said mechanism.

In all the figures like letters of reference indicate similar parts.

A is the breech end of the gun; B, the breech-block or breech-screw; C, the swinging carrier; D, the breech-actuating hand-lever having near its pivot the teeth D', gearing with the teeth B' on the breech-block for operating the latter.

E is the extractor, F the firing-pin or striker, and F' its mainspring.

The firing-gear is of the "slip-lock" type, the striker F being axial with respect to the breech-screw B and so arranged that by the pulling of a handle or of a lanyard connected with the lever $f^\times$ of the firing-gear the striker is cocked and eventually released during the same pulling operation. The striker is hollow to contain the mainspring F', which abuts at its rear end against a movable spring-case $f$ and at its forward end against a loose washer or collar $f'$, surrounding a rearward extension or stem $f^2$ of the nose of the striker. This collar abuts against a shoulder on the breech-screw and serves to abruptly terminate the forward impulse of the spring on firing, whereby the striker is caused to be thrown violently forward by virtue of its inertia independently of the spring. The said striker is extended rearwardly in the form of a vertical rectangular plate $f^3$, Figs. 5 to 9, having a stud $f^4$, that serves as an axis-pin for the slip-block $f^5$. This slip-block comprises a steel plate eccentrically mounted on said pivot and having a nose $f^6$, which is normally kept in engagement with a corresponding ledge $f^7$ on the rectangular plate $f^3$ by a spring $f^8$.

$f^9$ is a cam-shaft which extends transversely behind the firing-pin and has at one end a cam $f^{10}$ and a toe $f^{11}$. At the other extremity of the cam-shaft is an arm $f^{12}$, Fig. 5, for engagement with the firing-lever $f^{\times}$, which may have a loop for the attachment of the lanyard, the said firing-lever forming part of a spring-controlled shaft $f^{\times\times}$, arranged parallel to the cam-shaft $f^9$. The spring-case $f$ slides partly within the striker, its chief purpose being to give initial compression to the spring F′, to return the cam-shaft $f^9$ to its normal position after the firing of the gun, and to impart safety to the firing-gear. When the aforesaid cam-shaft $f^9$ is rocked by the actuation of the firing-lever $f^{\times}$, the toe $f^{11}$ engages with the slip-block $f^5$ and withdraws it, together with the striker, to the rear until the required throw is obtained, Fig. 8, and at the same time the spring-case $f$ is pushed slightly forward by the cam $f^{10}$, thereby imparting additional compression to the spring. When the striker has thus been withdrawn to the full extent, the slip-block $f^5$ rises and escapes from the toe $f^{11}$, whereupon the striker is forcibly projected forward by its spring to fire the gun, the said slip-block also moving forward with the striker, Fig. 9. Immediately the firing-lever $f^{\times}$ is released the energy that is still possessed by the spring F′, owing to the aforesaid additional compression it received under the influence of the cam $f^{10}$, causes the cam-shaft to return to its original position and the spring-case $f$ to retire slightly and resume its normal position, whereby the toe $f^{11}$ resumes its position in front of the slip-block $f^5$, ready to again cock the striker, Fig. 7. In the event of the primer of the cartridge failing to be detonated by the blow of the striker the latter may be repeatedly cocked and released until the primer has been detonated. When in the normal position, Fig. 7, the point of the striker lies within the front face of the breech-block, so that the slamming of the block in closing the breech cannot cause the primer of the cartridge-case to be detonated by the striker. This partial withdrawal of the firing-pin is effected by means of a pin $f^{13}$, carried by a block $f^{14}$, forming part of the spring-case and engaging with a slot $f^{15}$ in the rearward extension of plate $f^3$ of the striker, so that when the mainspring F′ of the striker operates to cause the spring-case and the cam-shaft to resume their normal position after firing said pin $f^{13}$ presses against the rearward end of the said slot $f^{15}$ and moves the striker rearwardly.

$F^2$ is a guide-plate for retaining the firing-gear in position. It lies in a recess formed in the rear face of the carrier C and is situated between the lugs C′ C′ on the said carrier, said lugs carrying the bearings for the spindle $D^2$ of the breech-actuating hand-lever D. On one side of the guide-plate there is provided a safety-catch $F^3$, having a spring-pin $F^4$, Figs. 4 and 5, which is adapted by an angular movement of the catch to enter one or other of two recesses $c' c^2$ in the carrier, and thus lock said catch in its extreme positions. This catch has a projection $F^5$, which can be engaged with or disengaged from a notch $F^6$ in the striker in accordance with the direction in which said catch is turned. In the position in which it is shown in Fig. 4 it is disengaged from the striker, so that the latter is free to move. When, however, the catch is turned into a vertical position to bring its projection $F^5$ into engagement with the notch $F^6$, it firmly retains the striker in the normal position, so that said striker cannot be moved in either direction. The striker is held in this position when the gun is traveling, so that should a live cartridge be left in the charge-chamber of the gun said cartridge cannot be fired by vibration of the striker during the traveling of the gun.

Instead of arranging the said firing-lever $f^{\times}$ to be actuated by a lanyard we may arrange it to be actuated by a firing-handle $F^{\times}$, Figs. 1 to 3, which is pivoted at $g$ to the guard-plate G of the gun-carriage and lies in front of the said firing-lever $f^{\times}$. It is normally kept in a forward position by a spring $g'$ and is limited in its to and fro movements by stops $g^2$ $g^2$.

In Figs. 10 and 11 we have illustrated the breech-actuating hand-lever D mounted at the top of the swinging carrier C, so that the handle of the said lever stands some distance above the gun-breech, with the object of enabling the hand of the gunner to be kept clear of the line of recoil, so that in the event of his not removing his hand immediately the breech is closed and of the gun then being fired his hand and arm will not be liable to injury by the recoil of the gun.

What we claim, and desire to secure by Letters Patent of the United States, is—

1. In firing-gear for breech-loading guns, the combination with the spring-controlled striker, of means for imparting additional compression to the striker-spring beyond that which it receives by the retraction of the striker during cocking, means for enabling said additional compression to react after firing and retract said striker into its safety position, and means for temporarily locking said striker in this position during the traveling of the gun substantially as described.

2. In firing-gear for breech-loading guns, the combination with the spring-controlled striker, of a hinged slip-block thereon, an actuating-shaft situated transversely with respect to the axis of said striker, a projection on said shaft coöperating with the slip-block for cocking and releasing the striker, a movable spring-case at the rear of the striker, a cam on said shaft coöperating with said spring-case for imparting additional compression to the striker-spring during retraction of the striker, and means for enabling said additional compression to react after firing and retract said striker into its safety position substantially as described.

3. In firing-gear for breech-loading guns, the combination with the spring-controlled striker, of a rearward extension thereon, a spring-controlled hinged slip-block on said extension, means for limiting the downward movement of said slip-block, an actuating-shaft situated transversely with respect to the axis of said striker, a projection on said shaft coöperating with the slip-block for cocking and releasing the striker, a movable spring-case at the rear of the striker, a cam on said shaft coöperating with said spring-case for imparting additional compression to the striker-spring during retraction of the striker, a loose block adjacent to said rearward extension of the striker, a pin thereon engaging with a slot in said rearward extension, and a cam-surface on said loose block with which when the actuating-shaft is released the cam on the actuating-shaft engages by the reaction of the compressed striker-spring and thereby shifts the loose block rearwardly and retracts the striker into its safety position, substantially as described.

4. In firing-gear for breech-loading guns, the combination with the spring-controlled striker, its slip-block and the actuating-shaft; of a firing-lever for operating said shaft, a firing-handle pivoted to the guard-plate of the gun-carriage and adapted to move in a plane parallel to the plane of movement of the striker for operating said firing-lever, and a spring for normally keeping said firing-handle in its inoperative position substantially as described.

5. In firing-gear for breech-loading guns, the combination with the spring-controlled striker, its slip-block and the actuating-shaft; of a firing-lever engaging with an arm on the actuating-shaft under the influence of a spring, a shaft situated parallel to the actuating-shaft and carrying said firing-lever and means for operating said firing-lever substantially as described.

6. In firing-gear for breech-loading guns, the combination with the spring-controlled striker, its slip-block and the actuating-shaft; of a firing-lever engaging with an arm on the actuating-shaft under the influence of a spring a shaft situated parallel to the actuating-shaft and carrying said firing-lever, a firing-handle pivoted to the guard-plate of the gun-carriage and adapted to move in a plane parallel to the plane of movement of the striker for operating said firing-lever, a spring for keeping said firing-handle in its inoperative position, and stops for limiting the extent of the movement of said firing-handle in either direction substantially as described.

7. In firing-gear for breech-loading guns, the combination with the spring-controlled striker and means for retracting the same; of a hinged catch angularly displaceable in a plane at right angles to the plane of movement of the striker, an eccentric projection on said catch adapted to be set into a position of engagement with or disengagement from a recess in the striker, and means for restraining said catch in either of its extreme positions substantially as and for the purpose specified.

In testimony whereof we have hereunto set our hands, in presence of two subscribing witnesses, this 14th day of September, 1904.

ARTHUR TREVOR DAWSON.
GEORGE THOMAS BUCKHAM.

Witnesses:
HENRY KING,
HERBERT H. FIELDING.